United States Patent
Kudirka et al.

(10) Patent No.: US 10,204,456 B2
(45) Date of Patent: Feb. 12, 2019

(54) MIXED REALITY GOLF SIMULATION AND TRAINING SYSTEM

(71) Applicant: vGolf, LLC, Omaha, NE (US)

(72) Inventors: Thomas Kudirka, Omaha, NE (US); Patrick J. Bennett, Broken Arrow, OK (US)

(73) Assignee: vGolf, LLC, Omaha, NE (US)

( * ) Notice: Subject to any disclaimer, the term of this patent is extended or adjusted under 35 U.S.C. 154(b) by 0 days.

(21) Appl. No.: 15/914,789

(22) Filed: Mar. 7, 2018

(65) Prior Publication Data
US 2018/0261010 A1 Sep. 13, 2018

Related U.S. Application Data

(60) Provisional application No. 62/468,044, filed on Mar. 7, 2017, provisional application No. 62/577,551, filed on Oct. 26, 2017.

(51) Int. Cl.
*G06T 19/00* (2011.01)
*A63B 69/36* (2006.01)
(Continued)

(52) U.S. Cl.
CPC ........ *G06T 19/006* (2013.01); *A63B 24/0021* (2013.01); *A63B 69/36* (2013.01);
(Continued)

(58) Field of Classification Search
CPC ... G06T 19/006; G06T 19/00; A63B 24/0021; A63B 69/36; A63B 2024/0028;
(Continued)

(56) References Cited

U.S. PATENT DOCUMENTS 9,694,269 B2   7/2017 Leech et al.
9,802,102 B2  10/2017 Leech et al.
(Continued)

FOREIGN PATENT DOCUMENTS

EP   3200008 A1   8/2017

OTHER PUBLICATIONS

"Seriously Anything: Future," Youtube video clip accessible as of Mar. 7, 2017 at https://youtu.be/5rW0P3wS4o, Ally Invest Securities LLC, apparently published on Sep. 11, 2017.
(Continued)

*Primary Examiner* — Xilin Guo
(74) *Attorney, Agent, or Firm* — Suiter Swantz PC LLO

(57) ABSTRACT

A mixed reality golf simulation and training system that can use, along with a user's existing standard golf equipment, a golf ball launch monitor to track the initial ball positional data, spin and acceleration, and simulate the complete ball path and location or use complete ball tracking data and displays the actual ball path and location. Mixed reality glasses allow the display of ball tracking data over the real world view and/or an immersive display of a simulated world view, depending on the user's head or view position. Golf simulation graphical views can include various options, including simulated or panoramic photographic views of a golf course, simulated graphics and data superimposed over a real world driving range view, or simple ball tracking data superimposed over a real world view at any location.

26 Claims, 13 Drawing Sheets

(51) Int. Cl.
*G02B 27/01* (2006.01)
*A63B 24/00* (2006.01)

(52) U.S. Cl.
CPC .... *G02B 27/017* (2013.01); *A63B 2024/0028* (2013.01); *G02B 2027/0138* (2013.01); *G02B 2027/0141* (2013.01); *G02B 2027/0178* (2013.01)

(58) Field of Classification Search
CPC ........... A63B 2053/0408; A63B 53/04; A63B 53/0487; A63B 2102/32; A63B 60/00; A63B 24/0003; A63B 37/0003; A63B 53/02; A63B 57/10; A63B 2024/0025; A63B 24/0006; A63B 2220/40; A63B 69/3632; A63B 69/00; A63B 2024/0009; G02B 27/017; G02B 2027/0178; G06F 3/011; G06F 3/012; G09B 19/0038; G09B 19/003; G09B 5/02; G06K 9/00671
See application file for complete search history.

(56) References Cited

U.S. PATENT DOCUMENTS

| | | | |
|---|---|---|---|
| 9,839,828 B2 | 12/2017 | Leech et al. | |
| 9,914,037 B2 | 3/2018 | Mats Nordstrom | |
| 2006/0116185 A1 | 6/2006 | Krull | |
| 2006/0287137 A1 | 12/2006 | Chu | |
| 2007/0238539 A1 | 10/2007 | Dawe et al. | |
| 2007/0298896 A1* | 12/2007 | Nusbaum | A63B 69/36 473/131 |
| 2011/0224027 A1 | 9/2011 | Edmondson | |
| 2012/0007885 A1 | 1/2012 | Huston | |
| 2013/0095924 A1 | 4/2013 | Geisner et al. | |
| 2013/0117377 A1 | 5/2013 | Miller | |
| 2013/0137076 A1 | 5/2013 | Perez et al. | |
| 2013/0172093 A1 | 7/2013 | Leech | |
| 2013/0328762 A1 | 12/2013 | McCulloch et al. | |
| 2014/0038750 A1 | 2/2014 | Leech | |
| 2014/0287806 A1 | 9/2014 | Balachandreswaran | |
| 2015/0050629 A1 | 2/2015 | Pease et al. | |
| 2015/0343294 A1* | 12/2015 | Leech | A63B 69/3608 473/209 |
| 2015/0373474 A1 | 12/2015 | Kraft et al. | |
| 2015/0379351 A1 | 12/2015 | Dibenedetto et al. | |
| 2016/0377864 A1* | 12/2016 | Moran | G02B 27/0172 345/8 |
| 2017/0028299 A1* | 2/2017 | The | G02B 27/017 |
| 2017/0142329 A1* | 5/2017 | Pelz | H04N 5/23219 |
| 2017/0151484 A1 | 6/2017 | Reilly et al. | |
| 2017/0203187 A1* | 7/2017 | Ito | G06F 17/30336 |
| 2017/0263056 A1* | 9/2017 | Leppanen | G06T 19/006 |
| 2017/0340948 A1 | 11/2017 | Leech | |
| 2018/0053284 A1 | 2/2018 | Rodriguez et al. | |
| 2018/0065018 A1 | 3/2018 | Leech et al. | |
| 2018/0256962 A1 | 9/2018 | Kudirka et al. | |
| 2018/0261010 A1 | 9/2018 | Kudirka et al. | |

OTHER PUBLICATIONS

U.S. Appl. No. 15/914,812, filed Mar. 7, 2018.
International Search Report PCT/US2018/021323 dated May 7, 2018, pp. 1-3. Written Opinion PCT/US2018/021323 dated May 7, 2018, pp. 4-11., May 7, 2018, 1-11.
International Search Report dated May 14, 2018 for PCT Patent Application No. PCT/US18/21317, pp. 1-3. Written Opinion dated May 14, 2018 for PCT Patent Application No. PCT/US18/21317, pp. 4-14.
International Search Report and Written Opinion dated Aug. 29, 2018 for PCT/US2018/034949.
International Search Report and Written Opinion dated Sep. 10, 2018 for PCT/US2018/036544.

* cited by examiner

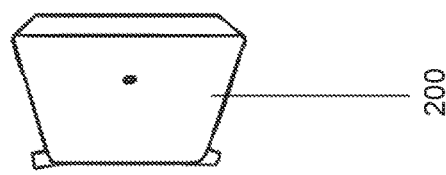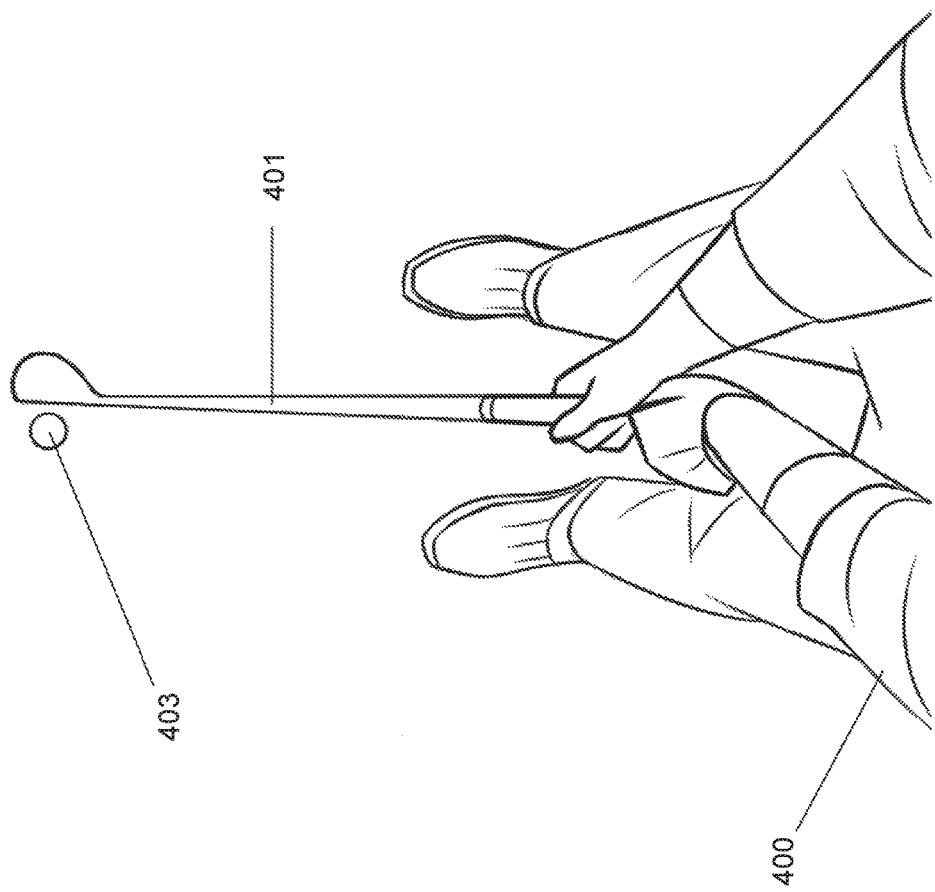
FIG. 8

MIXED REALITY GOLF SIMULATION AND TRAINING SYSTEM

This application claims the benefit of U.S. provisional patent application No. 62/468,044 filed on Mar. 7, 2017, and U.S. provisional patent application No. 62/577,551 filed on Oct. 26, 2017, each of which is incorporated by reference herein in its entirety.

FIELD

The present disclosure relates to golf simulation, and more particularly, to a mixed reality golf simulation and training system.

BACKGROUND

Golf is one of the most widely enjoyed sports throughout the world. However, golf enthusiasts cannot always find access to a golf course when they so desire. Accordingly, golf computer games also enjoy increasing popularity. However, golf games are limited in their degree of realism, and therefore, in their ability to entertain the user.

BRIEF DESCRIPTION OF THE DRAWINGS

FIG. 8 illustrates an example of the user's view of a regulation golf ball when looking down in preparation to hit the ball through the mixed reality glasses, showing an unobstructed real world view of the ball.

DETAILED DESCRIPTION

Figure 1:
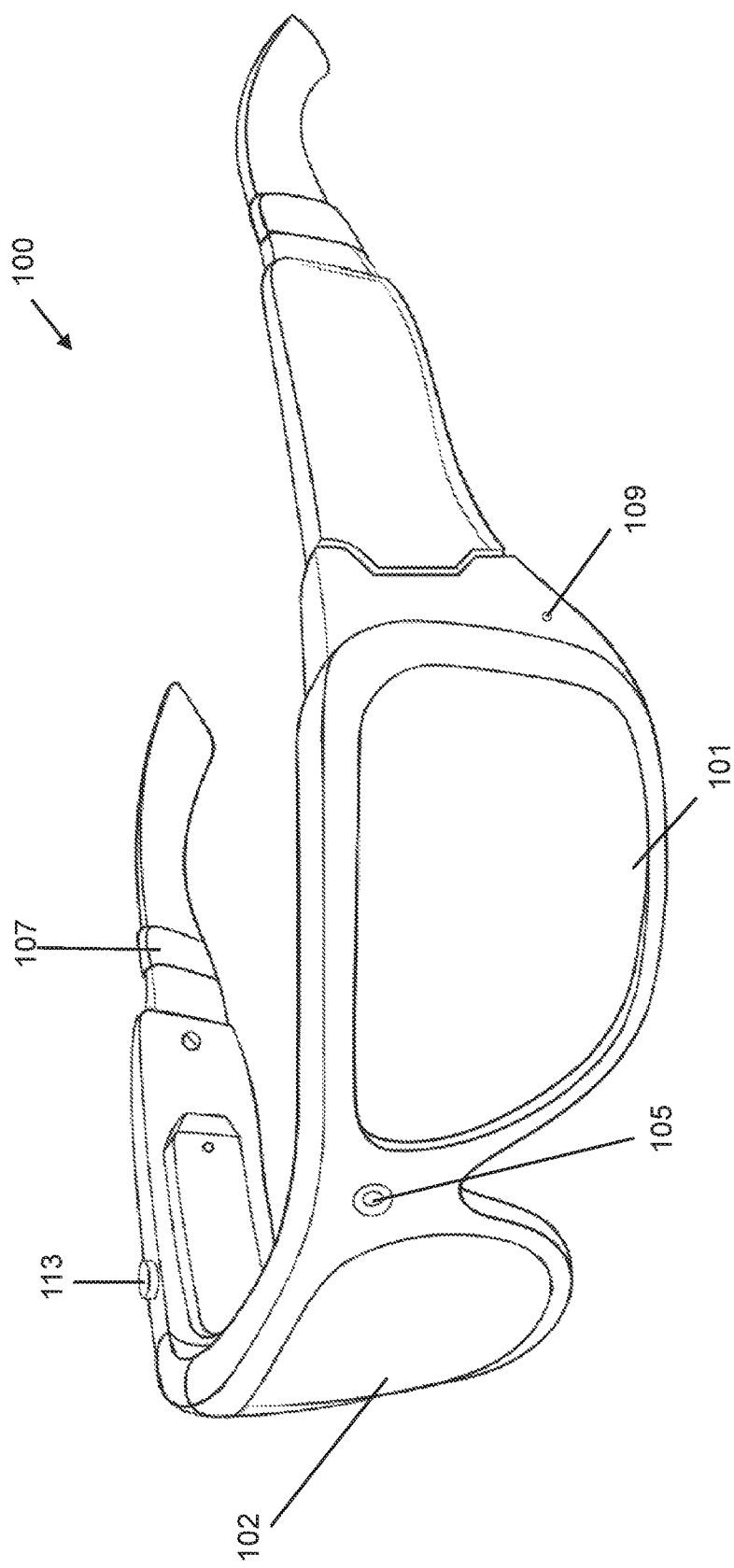
FIG. 1 shows an example of mixed reality glasses.

Current golf simulation technology is limited to projection screens, computer monitors and hand-held displays. These options are limited in their degree of realism, and therefore, in their ability to be entertaining or useful to the user. A mixed reality golf simulation and training system, on the other hand, blends the real world with a virtual overlay when viewed with mixed reality glasses, and therefore can be much more entertaining and/or instructive to a user, as described further below.

The present disclosure includes a mixed reality golf simulation and training system ("the system") that provides greatly increased realism and usefulness for purposes of golf practice, instruction or entertainment. In at least some embodiments, the system also includes augmented reality (AR) display capability. The term "mixed reality," as used herein, refers to a visualization technique in which a near-eye display (NED) device uses a display element that is at least partially transparent to overlay (superimpose) computer-generated (virtual) images on at least a portion of the user's field of view of the real world, where the overlaid images are positionally anchored to the real-world. The term "augmented reality," as used herein, refers to a visualization technique in which an NED device uses a display element that is at least partially transparent to overlay (superimpose) computer-generated (virtual) images on at least a portion of the user's field of view of the real world, where the overlaid images are not positionally anchored to the real-world. In the case of either mixed reality or AR display, the overlaid ("virtual") images may be opaque, such that they completely obscure at least a portion of the user's view of the real world, while in other instances, the overlaid images may be partially transparent. In some instances, the overlaid images may cover the user's entire field of view and/or may completely obscure the user's view of the real world.

The system uses mixed reality glasses as the primary visual feedback to the user. The user can use regulation golf clubs, golf balls and practice mats with the system. An active golf ball launch monitor, electronic ball, tethered ball motion sensor, or any other ball motion measurement device, provides the tracking and flight analysis that is used by system software to visually display the shot in a virtual golf course or driving range. The mixed reality glasses allow a user to see simultaneously the golf ball and a visual overlay of the golf course in relation to the user's visual orientation. Additionally, the mixed reality glasses provide a visual overlay of the tracking and motion analysis data over the real-world view from balls hit with or without a net. This supports virtual data display of the ball motion and tracking data, as well as game play elements, as the user hits the ball in a real world environment, such as on a golf course or at a driving range. As the user changes their visual orientation, the virtual course is updated to show the virtual environment in the proper orientation or the virtual data and game play elements are displayed in proper orientation over the real world view.

The system enables a user to hit an actual golf ball in a limited environment, or in a full course or driving range environment, and obtain visual feedback of what the golf ball trajectory would be on a real golf course. The visual feedback is displayed to the user though the mixed reality glasses. The visual feedback, including both golf ball and club data, and virtual environment display can be used as an entertainment device. The user can virtually play a round of golf, or hit multiple shots at a particular hole or practice driving in a virtual driving range, or the user can play an actual golf course or practice at an actual driving range and use the system to virtually display the ball motion and tracking data over the real world view. The display can also include additional elements, such as game play elements for entertainment value.

There are several advantages to the system over the existing technology. The mixed reality glasses provide a small, portable visual feedback system that is not available with systems utilizing projection screens or larger computer monitors. The mixed reality glasses also provide a virtual environment that is properly oriented to the user's field of view and orientation, which is not available with existing systems using large or smaller portable displays. The mixed reality glasses further provide sensor feedback that can be used to properly train the user to keep their head still and to keep looking at the ball during the shot, which is not available with existing systems.

The system supports several alternative modes of operation, including Virtual range, Virtual Caddy, Virtual Course, and Virtual Instructor. Each of these modes of operation supports the use of mixed reality glasses to provide visual feedback of the ball tracking data and simulation graphics supporting the simulation.

System Architecture and Components

Figure 7:
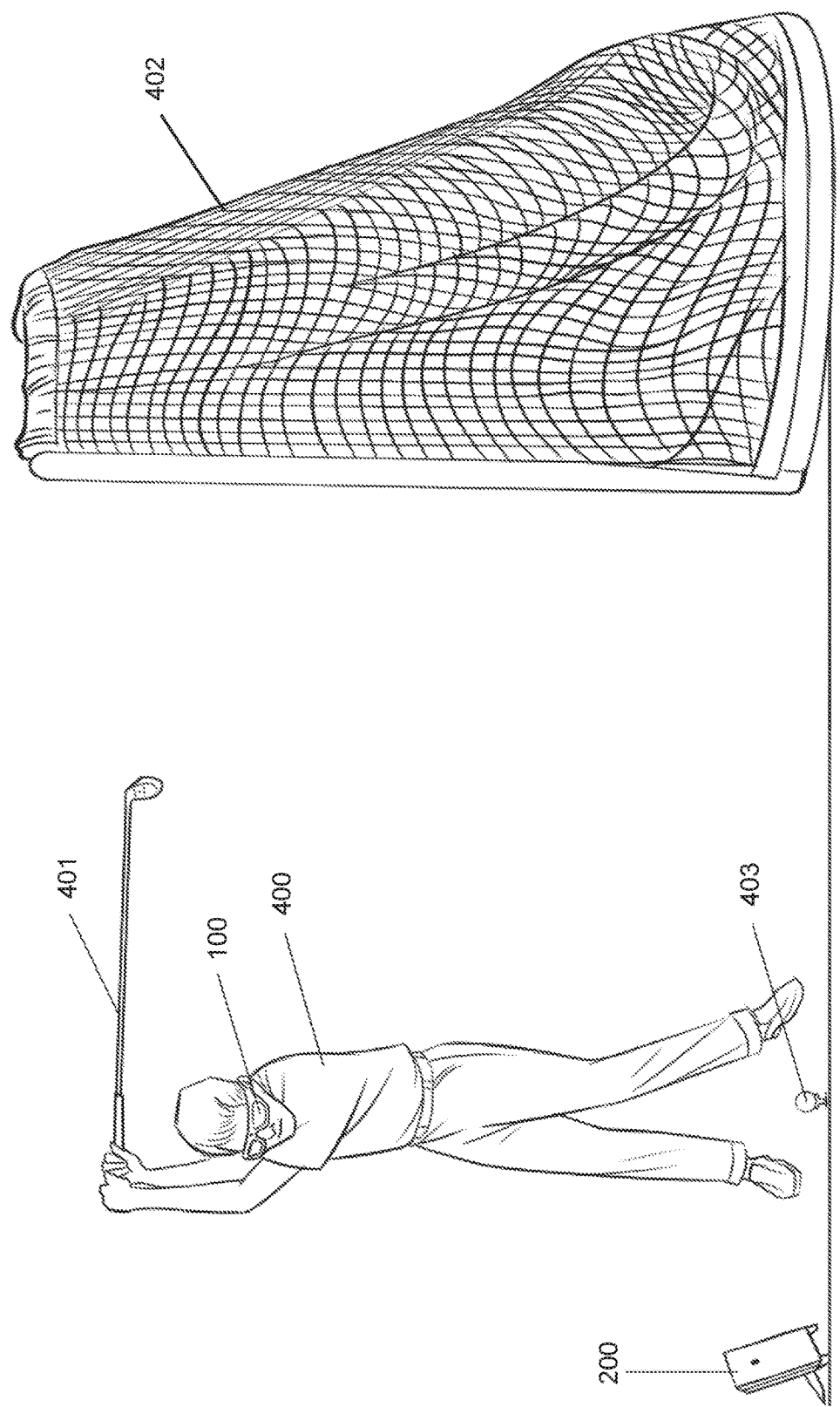
FIG. 7 is a diagram showing a configuration with a ball launch monitor, regulation golf ball, ball capture net and mixed reality glasses.

Referring first to FIG. 7, the mixed reality golf simulation and training system in at least one embodiment has two main components: mixed reality glasses 100, which the user 400 wears, and a golf ball launch monitor (or similar motion tracking device) 200. These two components 100 and 200 may be used in combination with the user's own, standard golf equipment, including a golf club 401, a regulation golf ball 403 and a golf ball shot distance limiting device 402 such as a net.

Figure 2:
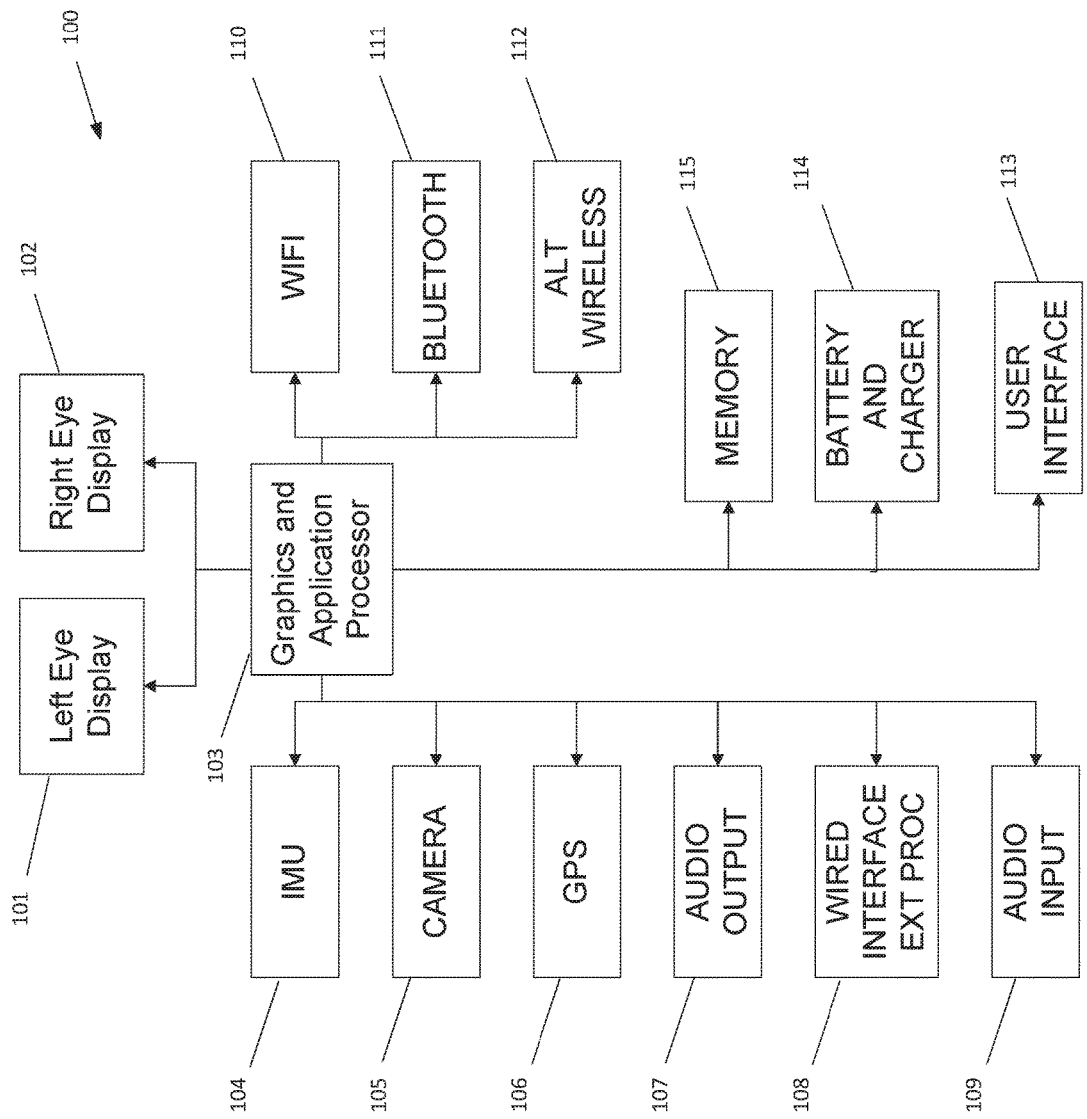
FIG. 2 is a block diagram showing an example of the components of mixed reality glasses.

The mixed reality golf simulation and training system includes mixed reality glasses 100, also called a headset, head-mounted display (HMD) device or NED device, which include the display elements main user interface and graphics processor. FIG. 1 shows an example of the mixed reality glasses 100, the functional components of which are shown in the block diagram of FIG. 2. The mixed reality glasses 100 include an NED display subsystem that includes a left eye NED element 101 and a right eye NED element 102 that are either fully or semitransparent, or fully opaque depending on the software application (i.e., they may provide variable transparency, such as through selective polarization of light). Software for performing operations of the mixed reality glasses 100 can reside in a memory 115, but may alternatively or additionally reside in an external processing system that communicates with the mixed reality glasses 100 through a wired communication interface 108 or wireless communication interface 110, 111, 112. In some embodiments, the main graphics and application processor 103 may include on-chip memory (not shown) that stores instructions and/or data for carrying out at least some of the operations of the mixed reality glasses 100.

In at least one embodiment, the main graphics and application processor 103 controls and coordinates the overall operation of the system, including coordination of the operations of other components of the mixed reality glasses 100, processing of data received from other components, and generation and/or pre-processing of data for display by the display elements 101, 102. The main graphics and application processor 103 can be or include, for example: one or more programmable microprocessors, microcontrollers, or the like: hardwired logic circuitry such as one or more application-specific integrated circuits (ASICs), programmable logic devices (PLDs), field programmable gate arrays (FPGAs), or the like; or any combination of programmable device(s) and/or hardwired logic device(s). Memory 115 may be or include one or more physical memory devices, each of which can be a type of random access memory (RAM), such as dynamic RAM (DRAM) or static RAM (SRAM), read-only memory (ROM), which may be programmable, such as flash memory, or any combination thereof. The term "software," as used herein, is intended to include any sequence of instructions stored in a non-transitory machine-readable medium and for execution by a programmable processor, including firmware.

The mixed reality glasses 100 in the illustrated embodiment also include one or more sensors for position detection in three-dimensional space, including an inertial measurement unit (IMU) 104 for sensing angular and/or linear rate of change and/or magnetic orientation. Additional sensors may include an integrated camera 105 for photometric positional detection and Global Positioning System (GPS) sensors 106 for satellite detection of position of the mixed reality glasses 100 relative to the earth.

The mixed reality glasses 100 may also include an audio output 107 component, which may include an audio amplifier and speaker or earphones, to provide audio feedback to the user, which may include voice narration or commands, or sound effects to provide audio cues or sound effects to further enhance the user experience. The mixed reality glasses may include a microphone 109 that allows the user to provide voice commands to the application and may monitor external sounds, such as the ball being hit, to provide additional feedback to the software application.

The mixed reality glasses 100 may communicate with the ball launch monitor 200, an electronic ball 300 (FIG. 3) and/or an external processor using one or more wireless communication interfaces 110, 111. These interfaces may include, for example, a Wi-Fi transceiver 110, or a Bluetooth transceiver 111 (e.g., Bluetooth 4.0 or 5.0). The mixed reality glasses 100 may additionally or alternatively include a custom alternate wireless interface 112 that utilizes public wireless frequencies, such as 900 MHz that allow for spread spectrum frequency hopping digital interface to provide a longer range (e.g., up to 20 miles) wireless link that is more immune to wireless interference, for communication to other glasses or a main data station.

The mixed reality glasses 100 may include a user interface 113 that may include a plurality of physical buttons, sliders, toggle switches or touch sensors. This interface will allow the user to startup, initialize, setup and operate the basic functions of the glasses and/or the user software application. The mixed reality glasses 100 may also include a user interface based on spoken commands input via the microphone 109.

The mixed reality glasses 100 may include a battery and battery charging circuit 114. The batteries may be one of several current battery technologies including rechargeable lithium ion or nickel-cadmium batteries or replaceable alkaline batteries. The battery charging circuit can connect to an external charging voltage source using a wired connection or a wireless charging pad.

Figure 5:
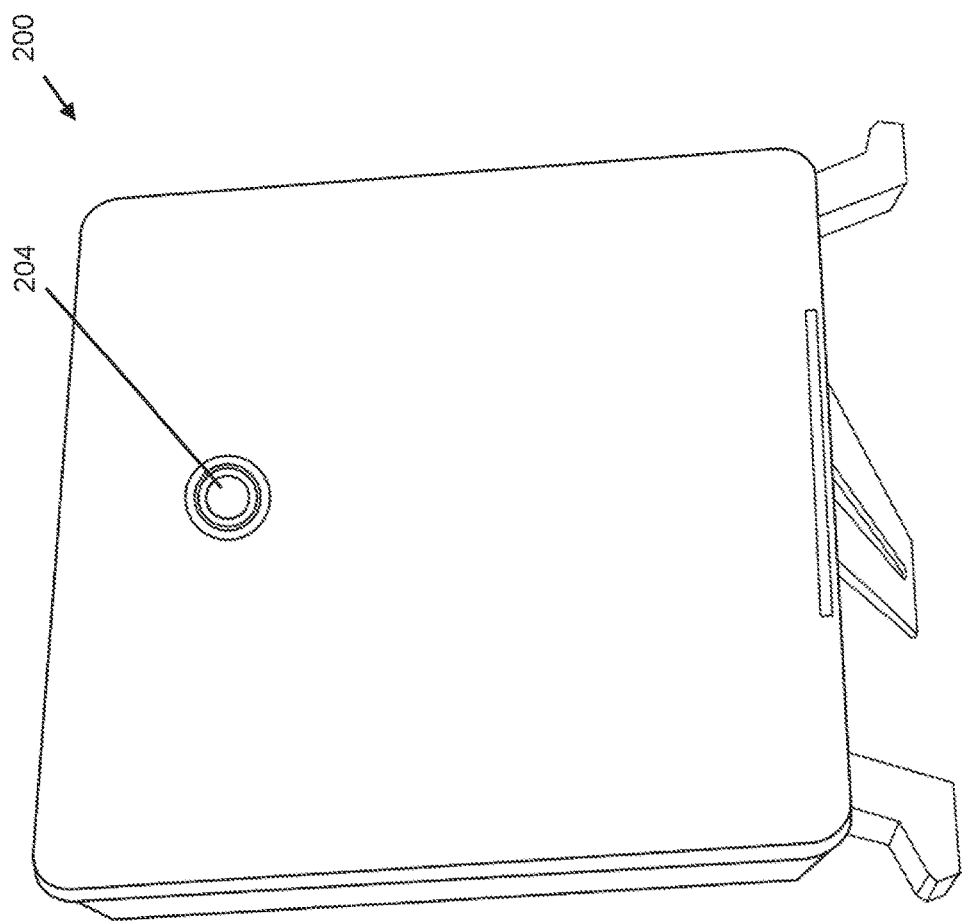
FIG. 5 shows a stand-alone ball launch monitor.
Figure 6:
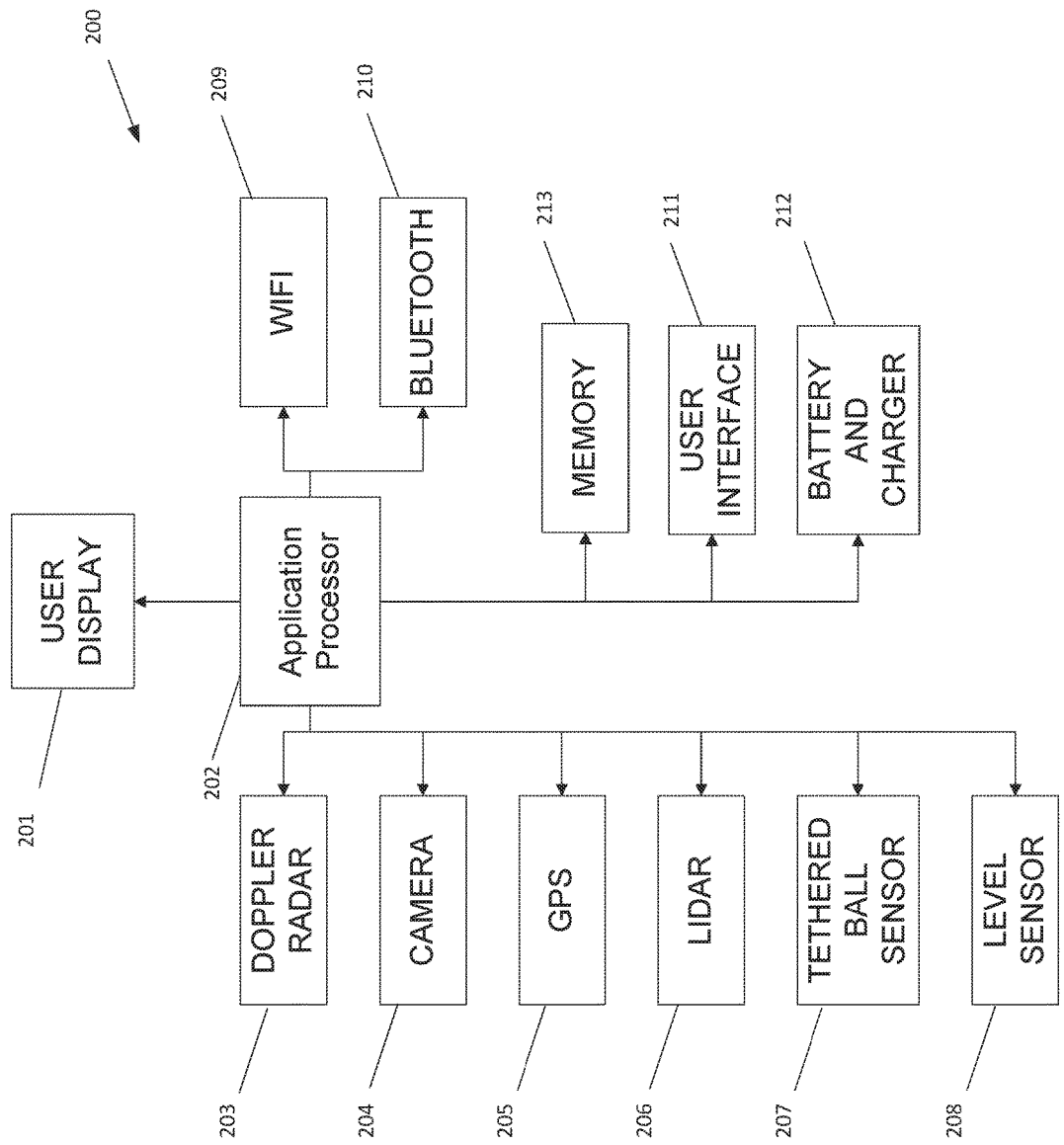
FIG. 6 is a block diagram showing an example of the internal components of the stand-alone ball launch monitor.

As mentioned above, the system can include a stand-alone ball launch monitor 200 (FIG. 7) to track the ball's position, speed and other pertinent data to provide an accurate representation and simulation of the ball flight and landing profile. The user's mixed reality glasses 100 display in real-time (i.e., immediately after the ball is hit) the ball position, speed and other pertinent data and provide an accurate graphical representation and simulation of the ball flight and landing profile. An example of a launch monitor is shown in FIGS. 5 and 6. Today there are several manufacturers of off-the-shelf ball launch monitors that use different technologies to track and provide data parameters, including companies such as FlightScope, Trackman, Foresight Sports and Ernest Sports, etc.

The launch monitor 200 includes several functional components, including a main application processor 202 which, in at least some embodiments, can execute a software application. The software may be stored in memory 213 coupled to or located in the application processor 202. The launch monitor 200 may also include a display 201 and a user interface 211 for providing a way for the user to set up, operate and view data from the launch monitor 200. The display 201 may be, for example, a monochrome or color liquid crystal display (LCD) or organic light emitting diode (OLED) type display, with or without a touchscreen input capability. The user interface 211 may include various buttons, sliders, toggle switches or touch panels to allow the user to select functions and control the software application settings and operations.

In some embodiments, the application processor 202 may include on-chip memory (not shown) that stores instructions and/or data for carrying out at least some of the operations of the launch monitor 200. In at least one embodiment, the application processor 202 controls and coordinates the overall operation of the launch monitor 200, including coordination of the operations of other components of the application processor 202, processing of data received from other components, and generation and/or pre-processing of data for display and/or for transmission to the mixed reality glasses 100. The application processor 202 can be or include, for example: one or more programmable microprocessors, microcontrollers, or the like: hardwired logic circuitry such as one or more application-specific integrated circuits (ASICs), programmable logic devices (PLDs), field programmable gate arrays (FPGAs), or the like; or any combination of programmable device(s) and/or hardwired logic device(s). Memory 213 may be or include one or more physical memory devices, each of which can be a type of random access memory (RAM), such as dynamic RAM (DRAM) or static RAM (SRAM), read-only memory (ROM), which may be programmable, such as flash memory, or any combination thereof.

The launch monitor may also include one or more electromagnetic sensors to determine the ball's location, spin and acceleration, and/or the club location, orientation and acceleration, all of which is processed by the software application to determine the data associated with the predicted ball flight and landing profile. These sensors may include a Doppler radar subsystem 203 for use to determine the ball and/or club position and speed, a camera 204 for use as a photometric measurement device to determine the ball and/or club location, speed, spin and various other data that can be determined from a photometric measurement, or Light Detection and Ranging (LiDAR) subsystem 206 for highly accurate laser range finding to determine with greater precision the ball and/or club location, speed, spin and acceleration. The sensors may include a GPS 205 satellite receiver used to determine the ball launch monitor position relative to the earth. The sensors may also include a tethered ball sensor 207 that uses a ball attached to a string or other tether which is attached to a base allowing the ball to be hit without a net. The ball tether is attached to a sensor, or the ball passes by a sensor in the base that measures the ball location, speed, spin and acceleration. The sensors may also include a level sensor 208 used to ensure that the launch monitor is properly and/or automatically leveled relative to the ground, which further ensures other sensors' accuracy and repeatability.

The launch monitor may communicate with the mixed reality glasses 100 by one or more wireless communication interfaces 209, 210. These interfaces may include, for example, a Wi-Fi transceiver 209 or a Bluetooth transceiver 210 implementing one of the recent versions of Bluetooth (e.g., Bluetooth 4.0 or 5.0).

The launch monitor 200 may also include a battery and battery charging circuit 212. The batteries may be one of several current battery technologies, including rechargeable lithium ion or nickel-cadmium batteries or replaceable alkaline batteries. The battery charging circuit can connect to an external charging voltage source using a wired connection or a wireless charging pad. Alternatively, the launch monitor 200 may include only a wired power connection to an external power source such as a low voltage DC power converter or external battery pack.

As an alternative to a stand-alone ball launch monitor 200 (FIG. 7), the system can instead utilize an "electronic ball," i.e., a ball that is essentially standard in materials and construction except that it includes internal circuitry that internally tracks the ball's position, spin, acceleration and other data, and transmits that information to the user's mixed reality glasses 100 in real-time via a wireless link. Hence, an electronic ball serves as its own launch monitor. The user's mixed reality glasses 100 display in real-time (i.e., immediately after the ball is hit) the ball position, speed and other pertinent data and provides an accurate graphical representation and simulation of the ball flight and landing profile.

Figure 3:
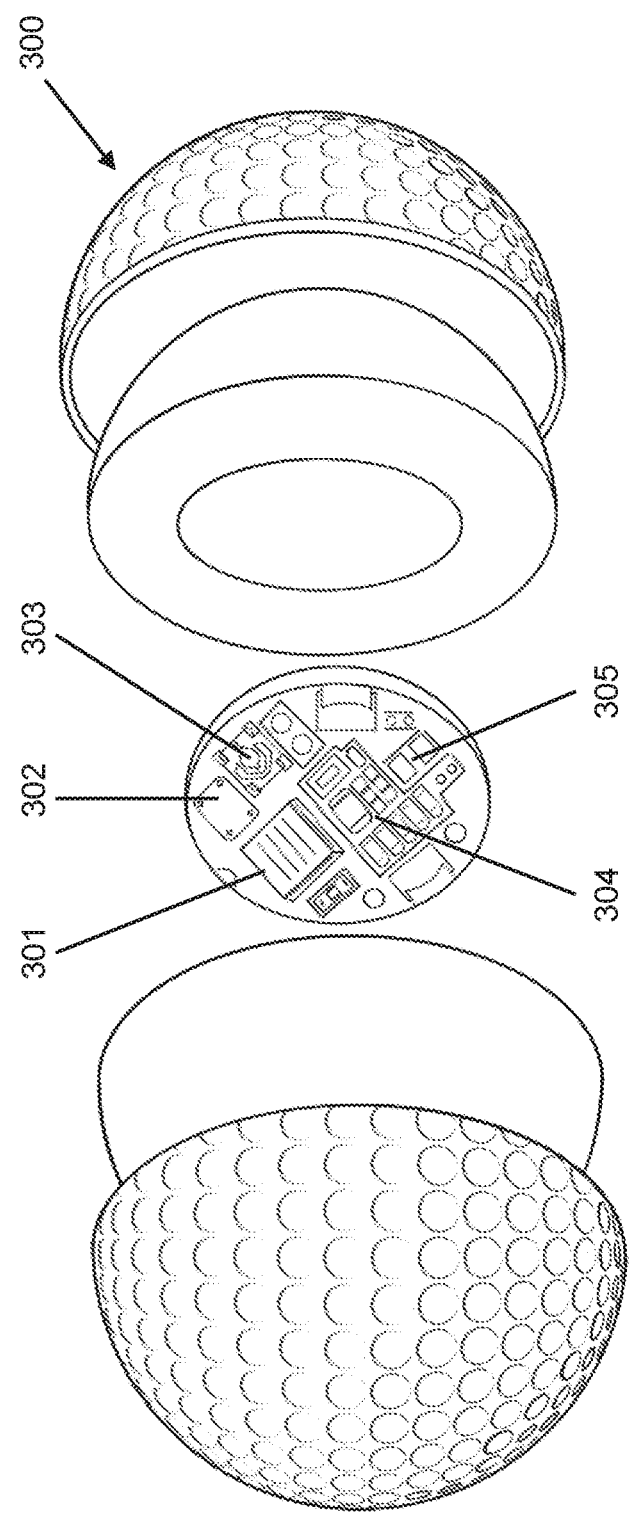
FIG. 3 shows an exploded view of an example of an electronic golf ball.
Figure 4:
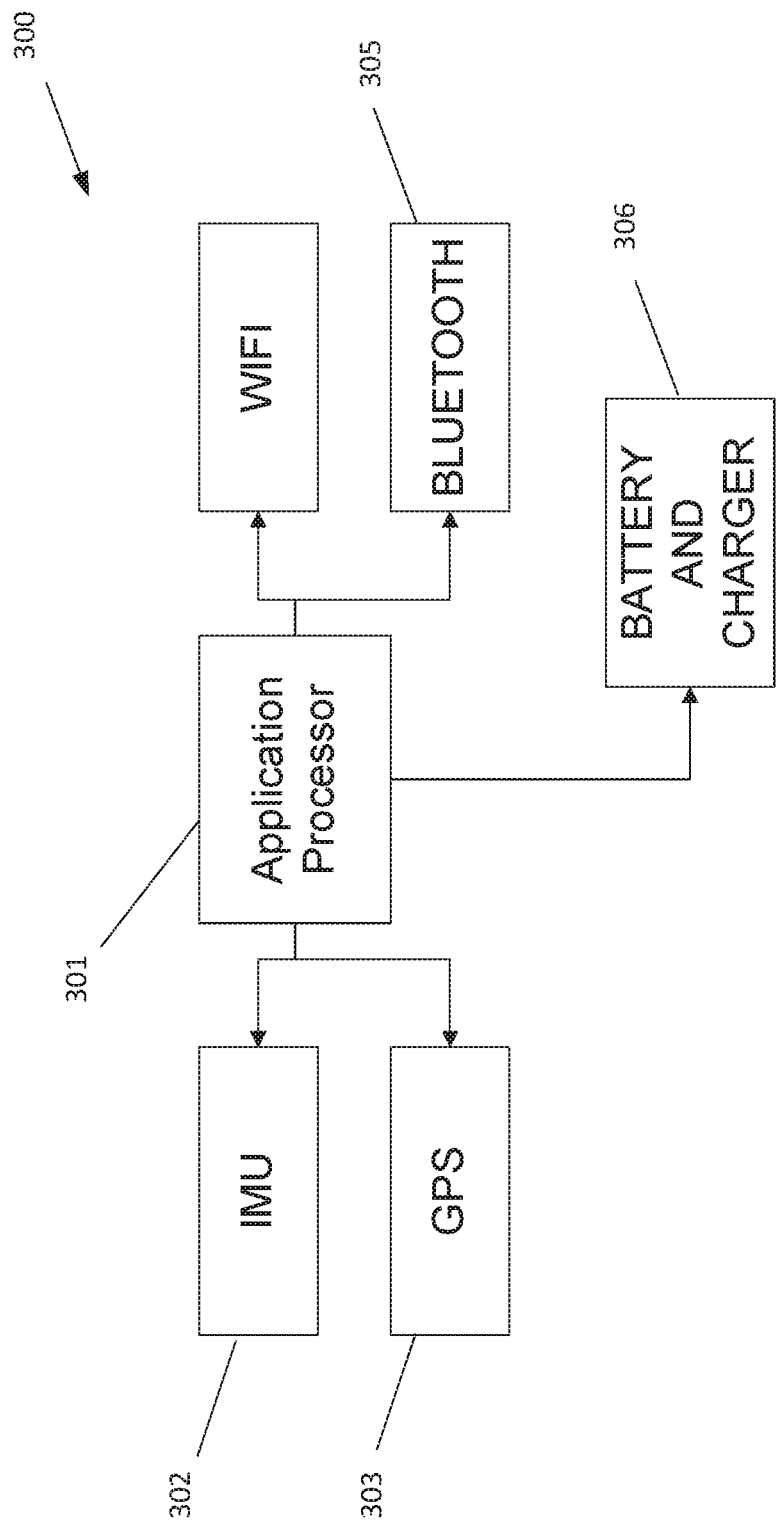
FIG. 4 is a block diagram showing an example of the internal functional components of the electronic ball.

An example of such an electronic ball is shown in FIGS. 3 and 4. The electronic ball 300 includes several functional components, including a main application processor 301 that executes the software application to convert raw sensor data into ball position, speed, spin and other pertinent data. The software may be stored in a memory (not shown) located in or coupled to the application processor 301. In at least one embodiment, the application processor 301 controls and coordinates operation of the functional elements within the ball 300. The application processor 301 can be or include, for example: one or more programmable microprocessors, microcontrollers, or the like: hardwired logic circuitry such as one or more application-specific integrated circuits (ASICs), programmable logic devices (PLDs), field programmable gate arrays (FPGAs), or the like; or any combination of programmable device(s) and/or hardwired logic device(s).

The electronic ball 300 may also include one or more electromagnetic sensors used to determine the ball location, spin and acceleration, and other data, all of which is processed by the software application to predict the ball flight and landing profile. These sensors may include, for example, an IMU 302 that measures ball linear and/or angular acceleration, magnetic orientation and other inertial measurements. The sensors may also include a GPS receiver 303 used to determine the ball's position relative to the earth.

The electronic ball 300 may communicate with the user's mixed reality glasses 100 using one or more wireless communication interfaces. These may include a Wi-Fi transceiver 304 or a Bluetooth transceiver 305 implementing one of the recent versions of Bluetooth (e.g., Bluetooth 4.0 or 5.0).

The electronic ball 300 may include a battery and battery charging circuit 306. The batteries may be one of several current battery technologies including rechargeable lithium ion or nickel-cadmium batteries. The battery charging circuit can connect to an external charging voltage source using a wireless charging pad or ball holder.

System Operation

The system transmits multiple ball position and tracking data from a launch monitor to the mixed reality glasses 100. This data includes parameters that are captured by a stand-alone ball launch monitor 200 or internally by an electronic ball 300. The raw captured data parameters are processed in the ball launch monitor or in the electronic ball into usable parameters that can be processed by the mixed reality glasses 100. These parameters can be transmitted to the mixed reality glasses 100 using one or more standard wireless communication technologies, such as Wi-Fi or Bluetooth.

With a stand-alone ball launch monitor 200, the parameters that are processed and wirelessly transmitted to the mixed reality glasses 100 can include the following: Vertical Launch Angle, Horizontal Launch Angle, Vertical Descent Angle, Smash Factor, Spin Rate, Spin Axis, Carry Distance, Roll Distance, Total Distance, Lateral Landing, Apex Height, Flight Time, Shot Dispersion, Shot Distance to Pin, Skills Score, Low point, Club Speed, Club Speed Profile, Club Acceleration Profile, Face to Path, Face to Target, Dynamic Loft, Angle of Attack, Club Path, Spin Loft, Swing Plane Horizontal, and Swing Plane Vertical.

With an electronic ball 300, the parameters that are processed and wirelessly transmitted to the mixed reality glasses can include the following: GPS Location, Distance of Roll, Spin Rate, Distance to Pin, Time and Distance of Carry, GPS Point of Carry End, Ball Speed, Angle of Descent, Carry Flight Path, Draw/Fade/Altitude High Delta, and Carry Height Apex.

The golf ball's flight path can be represented within the system by a polynomial, using known techniques. This polynomial can be evaluated and processed by a processor in the mixed reality glasses 100 (e.g., graphics and application processor 103) until the simulated ball path intersects a polygon mesh representing the ground. Standard rigid body physics calculations can then be performed to simulate the ball track along the ground polygon mesh.

The system may include software algorithms and/or hardwired logic that can use gyroscope/accelerometer/compass data to determine head rotation and a gravity sensor to determine the down direction. This data can be processed with, for example, a sensor fusion Kalman filter function or using functions of the Unity graphical software develop tool. The ball's flight path is then processed to generate various data that is displayed to the user, such as ball velocity, launch angle, ball spin, etc. These functions can be implemented, at least in part, by the graphics and application processor 103 of the mixed reality glasses 100.

The mixed reality glasses 100 provide both visual data and visual environment feedback to the user. The data feedback can include golf simulation data, such as statistics on the shot itself, such as ball speed, distance traveled, spin rate, spin orientation, golf club speed, and club orientation. The visual environment feedback can include displaying a fully immersive virtual environment to the user to allow the user to see the golf course or driving range (or any other type of playing field, e.g., if the system is implementing a virtual sport other than golf) as if the user were actually there and/or as virtual data overlaid on the user's real world view. The virtual environment may include computer generated models or computer enhanced photographic representations of a real golf course. Hence, the user's view of a virtual golf course or driving range (or other type of playing field, court, etc.) through the mixed reality glasses 100 can be based on a 3D rendered version of a golf course or driving range, or digital photos of a real golf course or driving range, or a combination of 3D rendering and digital photographic data. Alternatively, the ball motion and tracking data can be overlaid on the user's real world view.

One or more 360° panoramic photos of a real golf course (or multiple golf courses) can be digitally encoded and stored in memory in the mixed reality glasses 100, e.g., in equirectangular format, and rendered onto a graphical sphere for display. The user's viewpoint (i.e., a virtual camera) can be computationally located at the center of this virtual sphere. The 360° panoramic photos can be identified by GPS coordinates and can be loaded according to the physical ball location in the real world.

The system enables the user to hit an actual golf ball within a limited physical space, or on a full course or driving range, and obtain realistic visual feedback of what the golf ball trajectory would be on a real golf course. The visual feedback is displayed to the user by the mixed reality glasses 100. The visual feedback, which can include golf ball data and club data, and the virtual environment display can be used as an entertainment device. The user can virtually play a round of golf, or hit multiple shots at a particular hole or practice driving in a virtual driving range, or the user can play an actual golf course or practice at an actual driving range and use the system to virtually display the ball motion and tracking data over the real world view. The display can also include additional elements, such as game play elements for entertainment value.

In some embodiments and/or operational modes, the displayed virtual images (e.g., images of a virtual golf course) will appear to the user only when the user looks in a specific direction, such as the direction that the user has calibrated the mixed reality glasses to correspond to the direction of the hole. When the user looks in any other direction, the mixed reality images will not be displayed (except that certain AR data may be displayed near the edge of the user's field of view), such that his view of the real world will be mostly or completely unobstructed. Hence, when the user is looking down at the ball getting ready to swing, the user sees an unobstructed view of the ball and the surrounding ground; but as soon as the user looks up in the direction of the hole (i.e., the "target area"), the mixed reality images of the golf course will appear instantly, or nearly instantly, overlaid on or in place of the user's view of the real world. In at least some embodiments, it may be desirable to provide a user-perceptible transition (e.g., fade-in/out) from a non-display state to display state (and vice versa) of those images, to improve the user's visual comfort, since an instantaneous visual transition may be disconcerting to the user.

Figure 9:
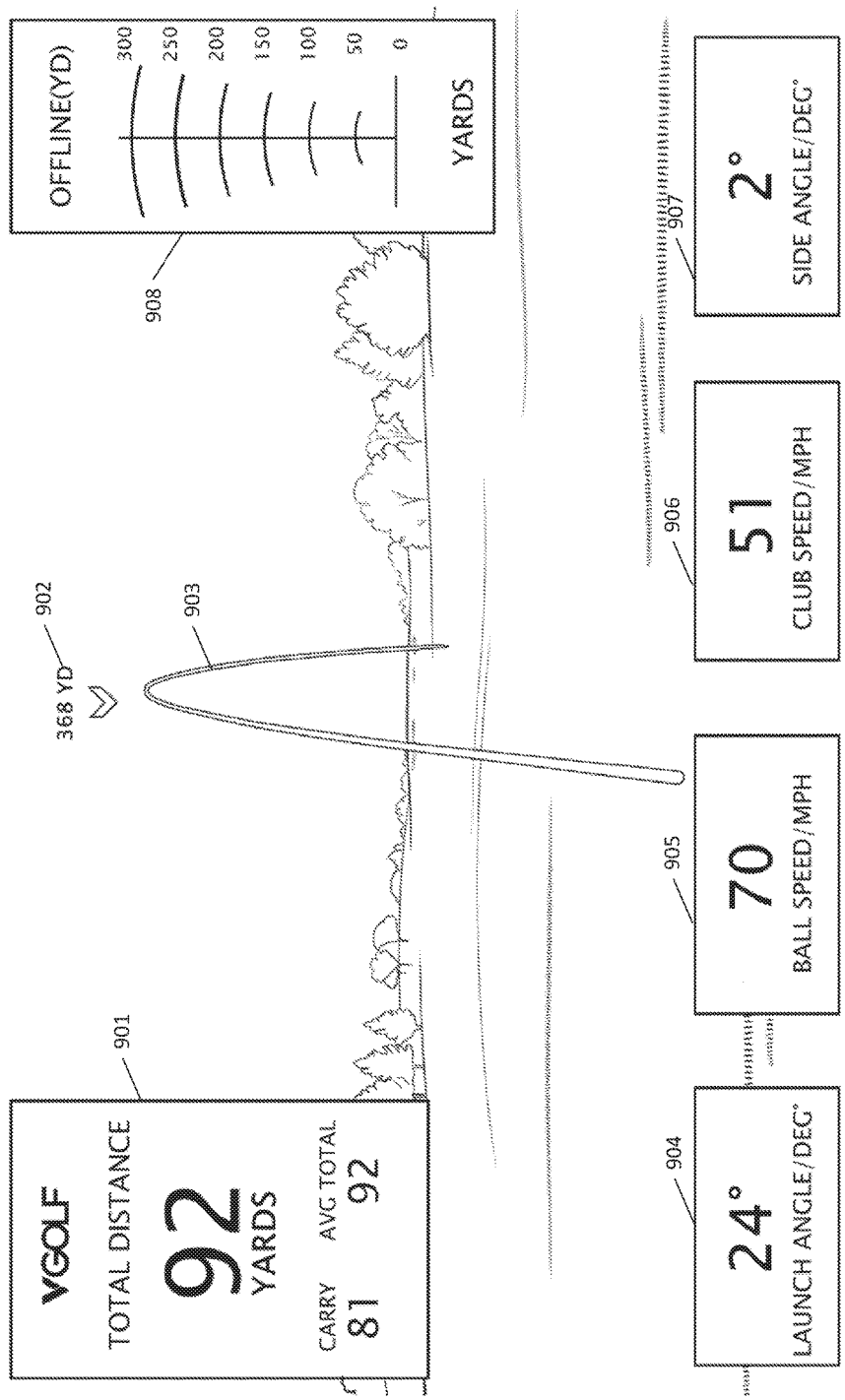
FIG. 9 illustrates an example of the user's view through the mixed reality glasses when the user looks up after hitting the ball, including the head-up display (HUD) and 360° virtual world displaying a golf course.

FIG. 8 illustrates an example of the user's view through the mixed reality glasses 100 of a regulation golf ball when looking down in preparation to hit the ball, showing an unobstructed real world view of the ball. In contrast, FIG. 9 illustrates a corresponding example of the user's view through the mixed reality glasses 100 when the user looks up after hitting the ball, including the panoramic view of a virtual golf course and head-up display (HUD) elements 901-908 that include golf simulation data. In this example view, the displayed images completely block the user's view of the real world. In other instances, however, it may be desirable for the displayed images to cover only part of the user's field of view and/or to make at least some of the displayed images partially transparent.

The system also enables multiple users to connect in a common virtual environment. Users separated by distance, but operating the system at the same time, can thereby play against each other, or as a team against other teams, in a virtual golf contest. Each user will see the virtual environment from their own individual perspective. Moving avatars of the other players can be displayed to each user. Avatars may be customizable, standardized or may represent popular professional golfers. Avatar movements may closely replicate the general orientation of the user, especially the orientation and movement of the user's head by using the mixed reality glasses sensors.

A user operates and controls the system though a user interface that can include physical buttons (not shown) on the mixed reality glasses 100 and/or alternative input devices, such as hand gesture and/or voice command recognition. The user input device(s) may be on the mixed reality glasses 100 and/or in a separate hand-held device (not shown) that communicates wired or wirelessly with the system, such as the user's smartphone, watch or local computer system.

In at least some embodiments, the system provides several modes of operation, including a Virtual Range mode, a Virtual Caddy mode, a Virtual Course mode and a Virtual Instructor mode. Each of these modes of operation supports the use of mixed reality glasses 100 to provide visual feedback of the ball tracking data and simulation graphics.

Figure 10:
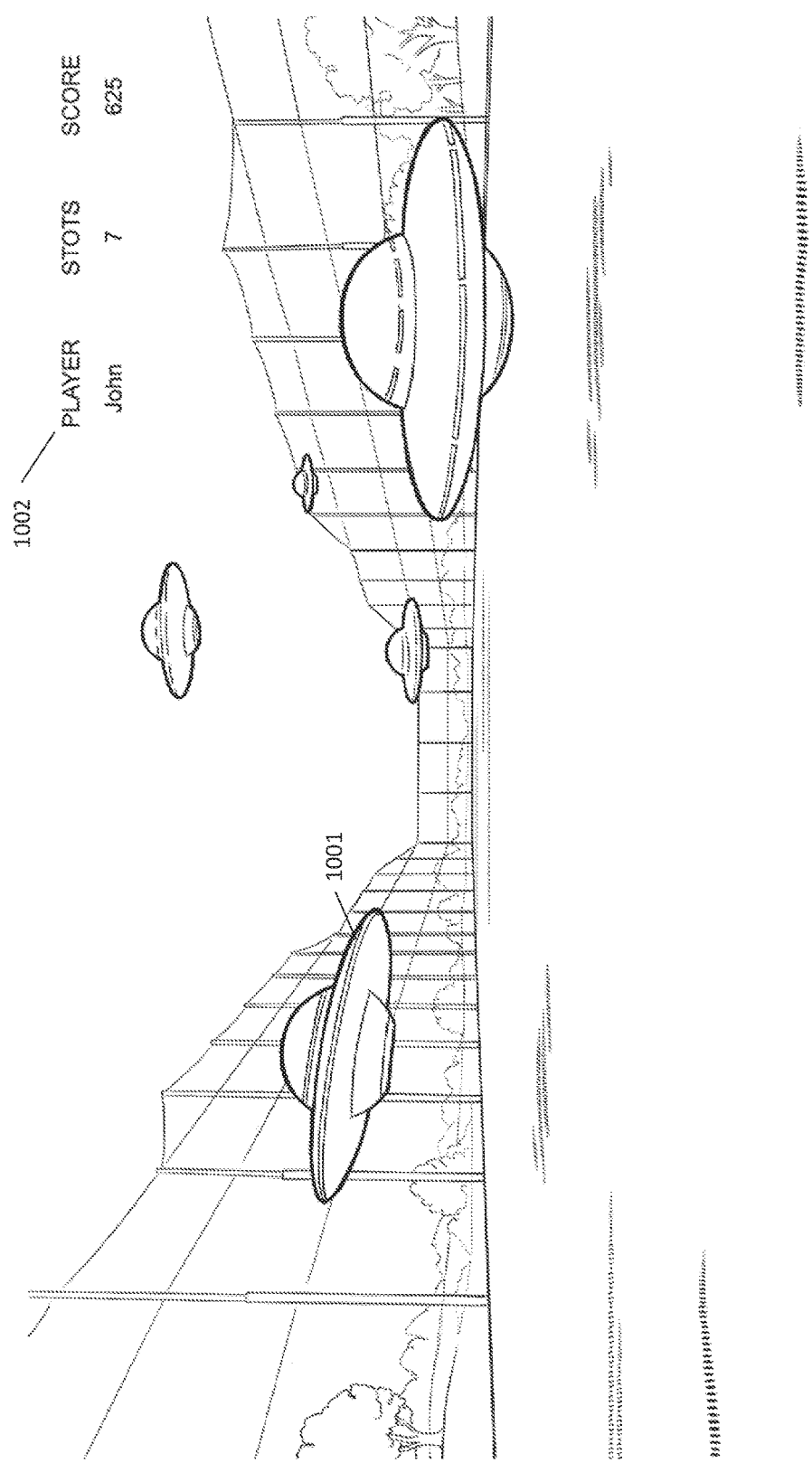
FIG. 10 illustrates an example of the user's view through the mixed reality glasses while in the Virtual Range mode.

The Virtual Range mode supports simulated graphics and ball tracking data superimposed on the real world view while using a real golf driving range or while hitting into a net. The simulated graphics may include a variety of animated targets and other entertainment style game play options. FIG. 10 illustrates an example of the user's view through the mixed reality glasses while using the Virtual Range mode. The view includes virtual graphical data, such as simulated targets 1001 and HUD data 1002, within a completely virtualized golf driving range or superimposed over the user's real world view of a real driving range, to enhance golf play at a driving range or other location.

In one embodiment of the Virtual Range mode the user experience is enhanced when hitting golf balls at a real driving range. The user operates the system by first turning on the mixed reality glasses 100, then places a golf ball on a tee that will be tracked using an external launch monitor or an electronic ball connected, by a wireless link, to the glasses. The user can calibrate, i.e. center, the mixed reality display showing a mixed reality view overlaid on the real world view. The view can be calibrated by looking in the direction in which the ball is intended to be hit and selecting the calibration function, e.g., by using either a switch, voice commands, or head/eye movement input. Once the view is calibrated the displayed mixed reality images will lock to that virtual position and will stay in that position regardless of where the user looks.

The mixed reality view includes various graphical elements that enhance the user experience. These graphical elements may be three-dimensional (3D), animated graphics showing a variety of targets that the user can aim at while hitting the ball at the range. After the user hits the ball and looks up in the direction of the ball, the display will show a graphical ball track along with animated graphics that react to and change based on the ball position along with scoring information. The display may also show various AR images/data, such as ball speed, shot distance, etc.

The Virtual Range mode also allows for multiple players in a group. Other users connected as a group will also be able to see the user's shot data along with current score. The user will be able to see shot and score data of the other players connected in the group.

Figure 11:
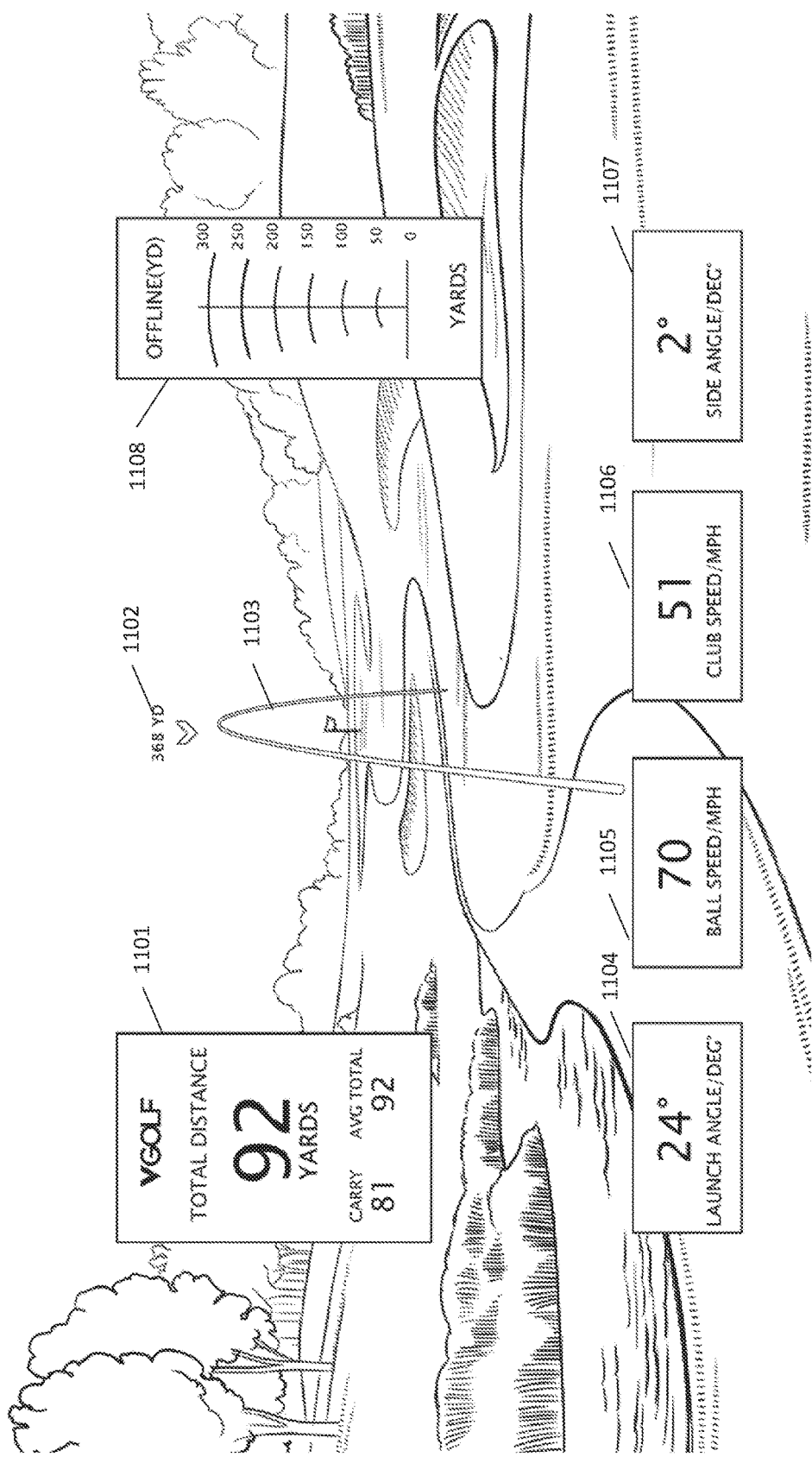
FIG. 11 shows an example of the user's view through the mixed reality glasses while in the Virtual Caddy mode, with the HUD displaying ball tracking data superimposed over the real world view visible when the user looks up after hitting the ball.

The Virtual Caddy mode provides the user with ball tracking and location data while golfing on a real golf course. FIG. 11 shows an example of the user's view through the mixed reality glasses while in the Virtual Caddy mode, with the HUD elements 1101-1108 displaying ball tracking data superimposed over the user's real world view of a golf course visible when the user looks up after hitting the ball.

In one embodiment, the user operates the system by first turning on the mixed reality glasses 100 of the Virtual Caddy mode, then places on a tee an electronic ball that is electronically connected, by a wireless link, to the glasses. The user can calibrate, i.e. center, the mixed reality HUD by looking in the direction in which the ball is intended to be hit and selecting the calibration function, e.g., by using either a switch, voice commands, or head/eye movement input. Once the HUD is calibrated the display will lock to that virtual position and will stay in that position regardless of where the user looks. The real world view is fully visible in all view directions, with the HUD data overlaid on the real world view. After the user hits the ball and looks up in the direction of the ball, the HUD display will show a graphical ball track along with AR images/data that can include, for example, ball speed, club speed, ball distance, carry distance launch angle, ball spin, flight time and score. After the ball lands the user may initiate a ball location finder function that will show a HUD target, arrows and audio cues to help the user locate the ball in the real world. In some embodiments, users connected as a group can see the user's shot data along with current score, and the user can see shot and score data of the other players connected in the group.

The Virtual Course mode allows the user to play a simulated golf course, complete with 360° panoramic views of a virtual golf course (FIG. 9) and includes a simulation and display of the ball tracking and location data. In one embodiment of the Virtual Course mode, the user can hit the ball into a net or at a driving range. The user operates the system by first turning on the mixed reality glasses 100, then places a regulation ball on a tee that will be tracked using an external launch monitor connected, by a wireless link, to the glasses. The user can calibrate, i.e. center, the mixed reality display showing a virtual view of a specific golf course hole that the user has selected. The view can be calibrated by looking in the direction in which the ball is intended to be hit and selecting the calibration function, e.g., by using either a switch, voice commands, or head/eye movement input. Once the view is calibrated the display will lock to that virtual position and will stay in that position regardless of where the user looks. The real world view is visible when the user looks down at the ball, and the virtual course view is visible when the user looks up and is visible throughout a full 360 degree view. After the user hits the ball and looks up in the direction in which the ball was hit, the display will show a graphical ball track along with data that can include, for example, ball speed, club speed, ball distance, carry distance launch angle, ball spin, flight time and score, overlaid on the virtual course view. After the ball "lands" (as computed/predicted by the system), the user may select a function that virtually transports them to the new ball location. The user then places another regulation ball on the tee and hits a shot that is from that virtual location.

The Virtual Course mode also allows for multiplayers in a group. Other users connected as a group will also be able to see the user's shot data along with current score. The user will be able to see shot and score data of the other players connected in the group. The mixed reality glasses may have microphones and speakers to allow the user to converse live with other players.

The Virtual Course mode may also allow the user to play against one or more virtual players. For example, while playing in the Virtual Course mode, the user can have the ability to play against a virtual Tiger Woods or other professional golfer. The virtual player avatar will be visible along with his/her shots and score. The user can play along with this virtual player though a full game of golf. Other game options may be a hitting distance contest at a virtual driving range or other mini-games, such as a putting challenge or a hitting over the water challenge (e.g., at the island green, hole #17 at Sawgrass). The system will allow the user to virtually move about the scene in three dimensions.

The Virtual Instructor mode provides training feedback in the form of, for example, a moving 3D avatar visible to the user in the virtual environment, which is essentially a virtual shadow user. Normally the Virtual Instructor mode will operate within the context of one of the other three modes, i.e., Virtual Range, Virtual Caddy or Virtual Course. For example, the user can invoke the Virtual Instructor while playing a round of golf in the Virtual Course mode. When operating in the Virtual Instructor mode, a virtual instructor provides feedback to the user, based on the shot data, in any of various forms, such as visual motion feedback, video replay of the user's avatar, video playback of stored images for instruction and audio feedback (e.g., recorded or synthesized speech) for short explanations and suggestions. The virtual instructor may respond to the user's questions posed verbally or through another user input device.

Figure 13:
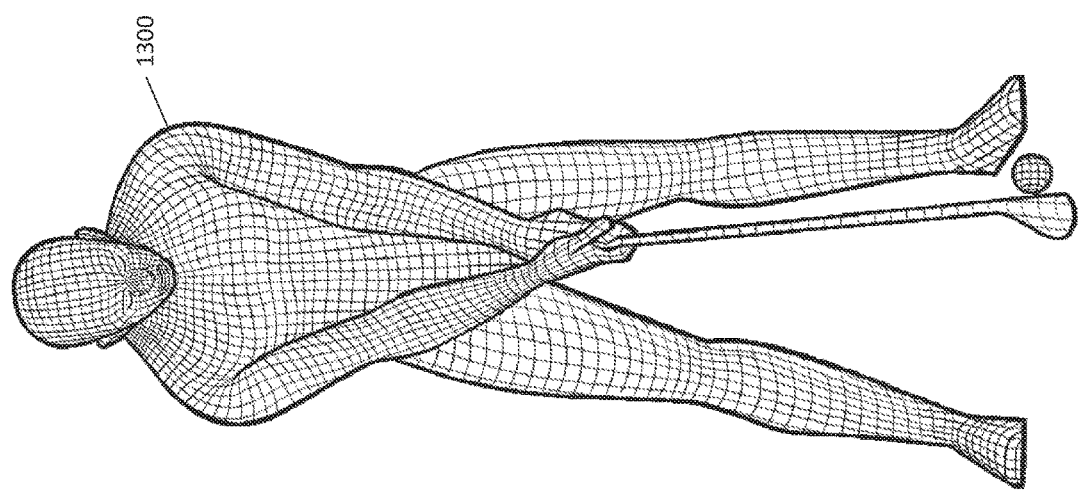
FIG. 13 is a drawing showing the users view through the mixed reality glasses of a 3D virtual avatar displayed during the Virtual Instructor mode.

FIG. 13 is a drawing showing the user's view through the mixed reality glasses of such a 3D (shadow user) avatar 1300 displayed during the Virtual Instructor mode. The shadow user avatar 1300 allows the system to visually demonstrate proper setup and form for a particular golf shot. The shadow user avatar 1300 can include highlighted and/or colored regions indicating key areas of concentration that should be followed in order to replicate the proper form for a particular golf shot. The Virtual Instructor mode may use the shadow user avatar 1300 to provide instruction and feedback.

Figure 12:
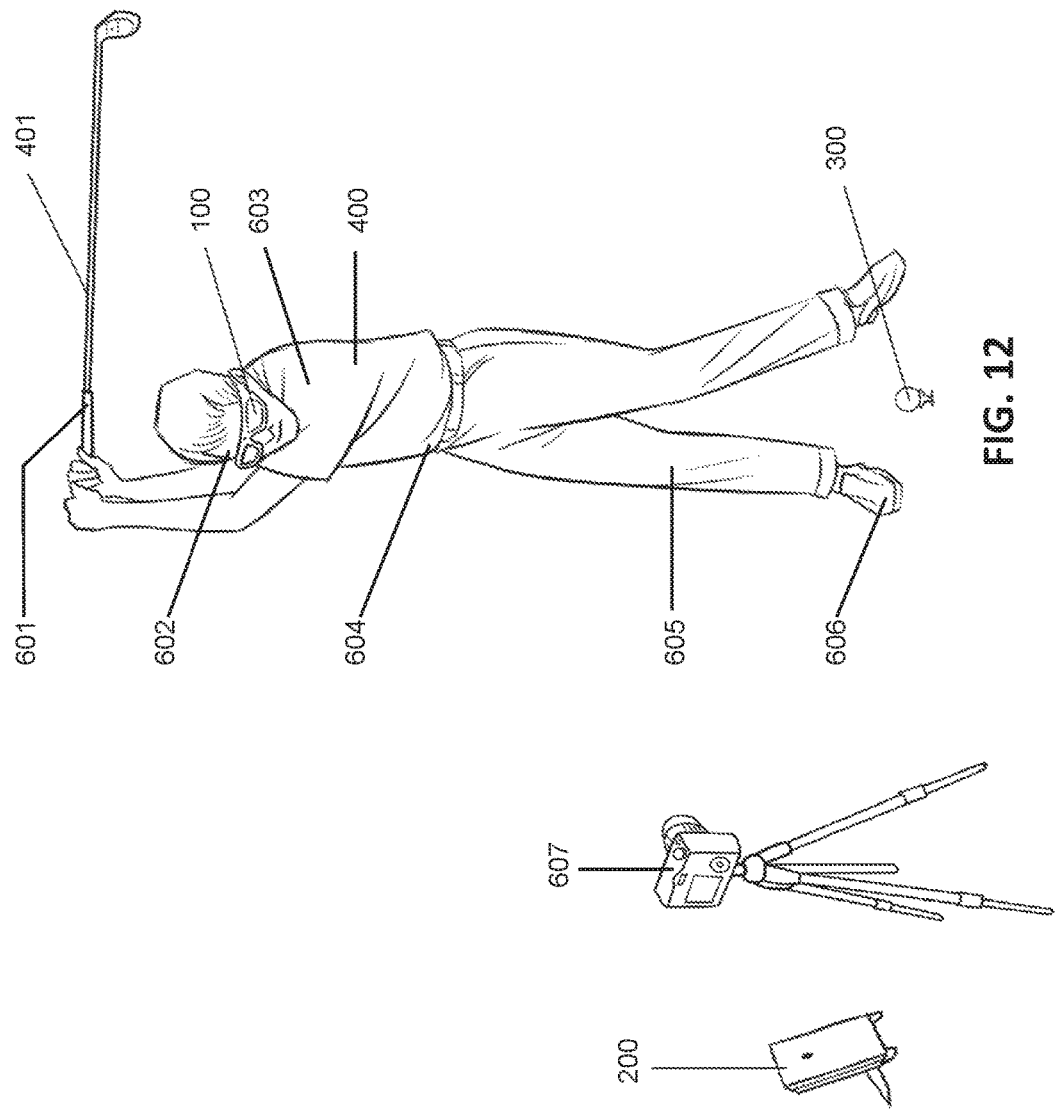
FIG. 12 is a drawing showing an example of the system configuration for the Virtual Instructor mode.

The system configuration for Virtual Instructor mode, an example of which is shown in FIG. 12, can include several components used to determine the user's body movement and technique. In this mode there may be additional sensors attached to the user's body, and/or a video camera to record the user's movement, both of which may be used to determine the user's motion and technique. The user's body movement and technique can be compared to ideal standards, and feedback can be provided to the user, through audio, video and/or computer-generated graphics, showing movements or techniques that can be improved.

In Virtual Instructor mode, the user may attach various sensors to their equipment and/or body. These sensors may include a golf club sensor 601 that measure the golf club position and acceleration, head band sensor 602 that measures the user's head position and angular/linear acceleration, shoulder sensors 603 that measure the user's shoulder position and movements, waist sensors 604 that measure the user's waist movements, leg sensors 605 that measure the user's leg position and movement, and a pressure sensitive mat or sole inserts worn within the shoes with sensors 606 that measure the user's individual foot pressures.

The various sensors, such as the foot pressure sensor, are related to the user's weight shift throughout the golf swing, which is a key aspect to proper technique resulting in optimal golf swings and ball distance. The virtual instructor software gathers the raw sensor information, analyzes it to determine the user's overall motion and technique and compares this to an ideal motion. Any discrepancies between the ideal motion and the user's motion can be displayed to the user along with instructions, either audio, video or computer-generated graphics, on techniques that may be employed to help the user practice motions and positions that better match the ideal.

The Virtual Instructor mode may also include a standard, stereo or advanced technology camera 607 that is used to motion capture the user's movements. This motion capture, in addition to or in place of the body sensors, may be used to determine the user's movements, both overall and for key locations on the user's body. This data is compared to the ideal movement and feedback is provided to the user, using audio, video or computer-generated graphics, along with instructional information that the user may use to practice improving their movements and overall technique.

As noted above, the system's mixed reality glasses 100 can include a plurality of sensors that include, but are not limited to, positional, rotational and acceleration feedback. This feedback may be used the by golf simulation software to determine the position, orientation and speed of the user's head before, during and after the shot. This data may be used in the training portion of the simulation to monitor for proper head orientation and stability and to provide both visual and audio feedback of proper and improper movements.

There are several advantages to the system over the existing technology. The mixed reality glasses 100 provide a small, portable visual feedback system that is not available with systems utilizing projection screens or larger computer monitors. The mixed reality glasses 100 provide a virtual environment that is properly oriented to the user's field of view and orientation, which is not available with existing systems using large or smaller portable displays. The mixed reality glasses 100 provide sensor feedback that can be used to properly train the user to keep their head still and to keep looking at the ball during the shot, which is not available with existing systems.

The Virtual Instructor mode provides instructional and audio and/or video feedback based on the result of hitting the ball. The feedback is based on the ball tracking data and may also include additional data sensors attached to the user's body to provide further data points for the instructional algorithms. Virtual Instructor can be used with a net or at a driving range or golf course. A video recording/sharing functionality can also be used.

In one embodiment of the Virtual Instructor mode, the user can hit the ball into a net, at a driving range or on a golf course. The user's body is tracked using sensors that are attached to specific locations on the user's body, such as the head, shoulders, waist, legs and feet and/or the golf club. Additionally, or alternatively, tracking the users body movement may be done by using a video camera.

The user operates the system by first turning on the mixed reality glasses 100, then places a regulation ball on a tee that will be tracked using an external launch monitor or an electronic ball connected, by a wireless link, to the glasses. The user can calibrate, i.e., center, the mixed reality display showing a virtual view of a specific golf course hole that the user has selected or only a graphical HUD overlaid on the real world view. The view can be calibrated by looking in the direction of where the ball is intended to be hit and selecting the calibration function, e.g., by using either a switch, voice commands, or head/eye movement input. Once the view is calibrated the display will lock to that virtual position and will stay in that position regardless of where the user looks. When using a Virtual Course view mode, the real world view is visible when the user looks down at the ball and the virtual course view is visible when the user looks up and is visible throughout a full 360-degree view. After the user hits the ball and looks up in the direction of the ball, the display will show a graphical ball track along with data that can include, for example, ball speed, club speed, ball distance, carry distance launch angle, ball spin, flight time and score overlaid on the virtual course view or the real world view depending on the mode the user has selected.

After the ball is hit a virtual three dimensional avatar representing the user is displayed in the mixed reality view. This avatar replays the user's golf swing and body movement, and the user is able to view this avatar mixed reality view from any angle. The Virtual Instructor logic analyzes the user's swing and body movement and highlights less-than-optimal body and swing movements on the user's avatar. The virtual instructor describes the movements that were less than optimal, provides instruction on techniques to improve and shows an updated avatar playing back the optimal swing and body movements for the user to see the optimal form.

The machine-implemented operations described above can be implemented by programmable circuitry programmed/configured by software, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software to implement the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software, such as one or more programmed general-purpose microprocessors, digital signal processors (DSPs) and/or microcontrollers, system-on-a-chip systems (SOCs), or other similar device(s); or c) a combination of the forms mentioned in a) and b).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A mixed-reality golf simulation system comprising:
   a ball-tracking sub-system configured to generate ball-tracking data when a golf ball is hit by a user;
   a near-eye display including a partially-transparent display element configured to display virtual objects over physical objects within a user field of view to provide a mixed-reality environment, wherein the near-eye display includes a user input device, wherein the near-eye display includes one or more head orientation sensors to determine a head orientation of the user; and
   a controller communicatively coupled to the ball-tracking sub-system and the near-eye display, the controller including one or more processors configured to execute program instructions causing the one or more processors to:
      receive a target direction from the user input device;
      direct the near-eye display to display, based on a head orientation of the user received from the near-eye display, virtual objects of a mixed-reality environment within at least a portion of the user field of view when the near-eye display indicates that the user is looking in the target direction, wherein the near-eye display provides an at least partially unobstructed real-world view through the partially-transparent display element when the near-eye display indicates that the user is looking in a direction different than the target direction;
      receive ball-tracking data of the golf ball hit by the user in real-time from the ball-tracking sub-system; and
      direct the near-eye display to display a virtual object representing a trajectory of the golf ball within the mixed-reality environment in real-time when the near-eye display indicates that the user is looking in the target direction, wherein the trajectory of the golf ball is based on the ball-tracking data.

2. The mixed-reality golf simulation system of claim 1, wherein the mixed-reality environment includes at least one of at least one of a fairway, a green, a trap, or a pin.

3. The mixed-reality golf simulation system of claim 1, wherein the at least partially unobstructed real-world view includes a fully unobstructed real-world view.

4. The mixed-reality golf simulation system of claim 1, wherein at least one of a location or an orientation of the user in the mixed reality environment is selectable with the user input device.

5. The mixed-reality golf simulation system of claim 1, wherein the one or more virtual objects of the mixed-reality environment include one or more augmented reality objects displayed over a portion of the field of view, wherein at least a portion of the field of view is unobstructed to provide visualization of physical objects through the partially-transparent display element, wherein a displayed perspective of the one or more augmented reality objects are continually updated based on at least one of a head orientation of the user from the near-eye display or a location of the user within the mixed reality environment.

6. The mixed-reality golf simulation system of claim 1, wherein the one or more virtual objects of the mixed-reality environment include a virtual reality scene obstructing at least a portion of the field of view from a vantage point of the user at a selected location within the virtual reality scene, wherein a displayed perspective of the virtual reality scene is continually updated based on at least one of a head orientation of the user received from the near-eye display or a location of the user within the mixed reality environment.

7. The mixed-reality golf simulation system of claim 1, wherein the near-eye display is configured to the one or more virtual objects of the mixed reality environment between a display state and a non-display state based on a head orientation of the user from the near-eye display.

8. The mixed-reality golf simulation system of claim 1, wherein the trajectory of the golf ball hit by the user is limited by a distance limiting device, wherein the virtual object representing a trajectory of the golf ball within the mixed-reality environment in real-time includes a predicted trajectory based on the ball-tracking data over a launch window ending when motion of the golf ball is hindered by the distance limiting device.

9. The mixed-reality golf simulation system of claim 8, wherein an opacity of the partially-transparent display element is adjustable.

10. The mixed-reality golf simulation system of claim 1, wherein the virtual object representing the trajectory of the golf ball comprises:
    a persistent trail indicative of at least a portion of the trajectory.

11. The mixed-reality golf simulation system of claim 1, wherein the one or more processors are further configured to execute program instructions causing the one or more processors to:
    direct the near-eye display to display virtual objects representing at least one of a launch velocity, a launch angle, a hook angle, a rotation axis, a rotation rate, a hang time, a carry distance, a roll distance, or a total distance of the golf ball.

12. The mixed-reality golf simulation system of claim 1, wherein the mixed-reality environment comprises:
    an avatar associated with a remote user.

13. The mixed-reality golf simulation system of claim 1, wherein the one or more processors are further configured to execute program instructions causing the one or more processors to:
    direct the near-eye display to provide coaching feedback to the user based on the trajectory, wherein the coaching feedback includes at least one of audio information or virtual objects displayed over at least a portion of the user field of view.

14. The mixed-reality golf simulation system of claim 1, further comprising:
    a user-tracking sub-system including one or more sensors to generate user-motion data indicative of motion of the user during a shot.

15. The mixed-reality golf simulation system of claim 14, wherein the one or more sensors comprise:
    at least one of a camera or one or more wearable sensors.

16. The mixed-reality golf simulation system of claim 14, wherein the one or more processors are further configured to execute program instructions causing the one or more processors to:
    direct the near-eye display to display a virtual object including an avatar representing the user after the user hits the golf ball, wherein the avatar simulates motion of the user hitting the golf ball based on the user-motion data, wherein the avatar is viewable from any angle in the mixed-reality environment.

17. The mixed-reality golf simulation system of claim 1, wherein the ball-tracking sub-system is located external to the golf ball.

18. The mixed-reality golf simulation system of claim 17, wherein the ball-tracking sub-system comprises:
    at least one of a camera, a doppler-tracking device, or a LIDAR-tracking device.

19. The mixed-reality golf simulation system of claim 1, wherein the ball-tracking sub-system is located within the golf ball.

20. The mixed-reality golf simulation system of claim 19, wherein the ball-tracking sub-system comprises:
    at least one of a motion sensor, an accelerometer, an orientation sensor, or a position sensor; and
    a wireless communication device for transmitting the ball-tracking data to the controller.

21. A mixed-reality golf simulation system comprising:
    a ball-tracking sub-system configured to generate ball-tracking data of a golf ball within a launch window when the golf ball is hit by a user, wherein a trajectory of the golf ball is limited by a distance limiting device;
    a near-eye display including a partially-transparent display element configured to display virtual objects over physical objects within a user field of view to provide a mixed-reality environment, wherein the near-eye display includes a user input device, wherein the near-eye display includes one or more head orientation sensors to determine a head orientation of the user; and
    a controller communicatively coupled to the ball-tracking sub-system and the near-eye display, the controller including one or more processors configured to execute program instructions causing the one or more processors to:
        receive, from the user input device, a direction from which the golf ball is to be hit;
        direct the near-eye display to display, based on a head orientation of the user received from the near-eye display, virtual objects of a mixed-reality environment within at least a portion of the user field of view;
        direct the near-eye display to provide, based on the head orientation of the user received from the near-eye display, an unobstructed real-world view through the partially-transparent display element of the location from which the golf ball is to be hit;
        receive ball-tracking data of the golf ball over the launch window in real-time from the ball-tracking sub-system as the user hits the golf ball; and
        direct the near-eye display to display a virtual object representing the golf ball moving along a predicted trajectory after the launch window within the mixed-reality environment, wherein the predicted trajectory is determined based on the ball-tracking data within the launch window.

22. The mixed-reality golf simulation system of claim 21, wherein the launch window ends when motion of the golf ball is hindered by the distance limiting device, wherein the distance limiting device includes at least one of a net or a tether.

23. The mixed-reality golf simulation system of claim 22, wherein the distance limiting device comprises:
    at least one of a net or a tether.

24. The mixed-reality golf simulation system of claim 21, wherein the one or more virtual objects of the mixed-reality environment include one or more augmented reality objects displayed over a portion of the field of view, wherein at least a portion of the field of view is unobstructed to provide visualization of physical objects through the partially-transparent display element, wherein a displayed perspective of the one or more augmented reality objects are continually updated based on at least one of a head orientation of the user from the near-eye display or a location of the user within the mixed reality environment.

25. The mixed-reality golf simulation system of claim 21, wherein the one or more virtual objects of the mixed-reality environment include a virtual reality scene obstructing at least a portion of the field of view from a vantage point of the user at a selected location within the virtual reality scene, wherein a displayed perspective of the virtual reality scene is continually updated based on at least one of a head orientation of the user received from the near-eye display or a location of the user within the mixed reality environment.

26. A multi-user mixed-reality golf simulation system comprising:
- at least one ball-tracking sub-system configured to generate ball-tracking data of one or more golf balls over a launch window when the one or more golf balls are hit by at least one of two or more users;
- two or more near-eye displays, each near-eye display including a partially-transparent display element to be worn by at least one of the two or more users, wherein each of the two or more users wears a single near-eye display of the two or more near-eye displays, wherein the two or more near-eye displays are configured to display virtual objects over physical objects within user fields of view to provide a mixed-reality environment, wherein each of the two or more near-eye displays include a user input device, wherein each of the two or more near-eye displays include a head orientation sensor to determine head orientations of the two or more users; and
- a controller communicatively coupled to the ball-tracking sub-system and the near-eye display, the controller including one or more processors configured to execute program instructions causing the one or more processors to:
  - direct the two or more near-eye displays to display, based on head orientations of the two or more users received from the two or more near-eye displays, virtual objects of a common mixed-reality environment from different locations associated with locations of the two or more users, wherein a near-eye display of the two or more near-eye displays worn by a user of the two or more users hitting a golf ball of the one or more golf balls provides an unobstructed real-world view through the partially-transparent display elements of a location from which the golf ball is to be hit when the near-eye display worn by the user hitting the golf ball indicates that the user hitting the golf ball is looking in the direction from which the golf ball is to be hit, wherein the location from which the golf ball is to be hit is selectable with a user input device on the near-eye display worn by the user hitting the golf ball;
  - receive ball-tracking data of one or more golf balls hit by any of the two or more users in real-time from the at least one ball-tracking sub-system; and
  - direct the two or more near-eye displays to display virtual objects representing trajectories of the one or more golf balls hit by at least one of the two or more users in real-time, wherein the trajectories are determined based on the ball-tracking data, wherein the trajectories are displayed on the two or more near-eye displays based on the locations of the two or more users within the mixed-reality environment.

\* \* \* \* \*